United States Patent
Schmidt et al.

(10) Patent No.: US 10,494,495 B2
(45) Date of Patent: Dec. 3, 2019

(54) KIT FOR PRODUCING COMPOSITE SEMI-FINISHED PRODUCTS COMPRISING REVERSIBLY CROSSLINKED POLYMER EMULSIONS

(71) Applicants: Friedrich Georg Schmidt, Haltern am See (DE); Stefan Hilf, Singapore (SG); Florian Hermes, Frankfurt (DE); Dorothea Staschik, Nidderau (DE); Thomas Eurich, Hanau (DE); Rebecca Pieroth, Ronneburg (DE)

(72) Inventors: Friedrich Georg Schmidt, Haltern am See (DE); Stefan Hilf, Singapore (SG); Florian Hermes, Frankfurt (DE); Dorothea Staschik, Nidderau (DE); Thomas Eurich, Hanau (DE); Rebecca Pieroth, Ronneburg (DE)

(73) Assignee: EVONIK DEGUSSA GmbH, Essen (DE)

( * ) Notice: Subject to any disclaimer, the term of this patent is extended or adjusted under 35 U.S.C. 154(b) by 6 days.

(21) Appl. No.: 15/329,177

(22) PCT Filed: Jul. 30, 2015

(86) PCT No.: PCT/EP2015/067457
§ 371 (c)(1),
(2) Date: Jan. 25, 2017

(87) PCT Pub. No.: WO2016/020250
PCT Pub. Date: Feb. 11, 2016

(65) Prior Publication Data
US 2017/0218149 A1    Aug. 3, 2017

(30) Foreign Application Priority Data

Aug. 6, 2014   (EP) .................................... 14180027

(51) Int. Cl.
*C08J 5/24*    (2006.01)
*C09D 133/12*  (2006.01)

(52) U.S. Cl.
CPC .............. *C08J 5/24* (2013.01); *C09D 133/12* (2013.01); *C08J 2333/06* (2013.01); *C08J 2333/12* (2013.01)

(58) Field of Classification Search
CPC .................................. C08J 5/24; C09D 133/12
See application file for complete search history.

(56) References Cited

U.S. PATENT DOCUMENTS

| | | | |
|---|---|---|---|
| 6,616,971 B2 | 9/2003 | Evans | |
| 8,916,635 B2 | 12/2014 | Schmidt et al. | |
| 9,169,363 B2 * | 10/2015 | Schmidt | ............... C08J 3/24 |
| 9,550,851 B2 | 1/2017 | Barner-Kowollik et al. | |
| 2003/0054510 A1 * | 3/2003 | Ebdrup | ................ C12P 7/42 |
| | | | 435/135 |
| 2004/0018352 A1 * | 1/2004 | Evans | .............. B29B 15/105 |
| | | | 428/292.1 |
| 2014/0323001 A1 * | 10/2014 | Schmidt | ................ C08J 3/24 |
| | | | 442/59 |
| 2015/0299363 A1 | 10/2015 | Barner-Kowollik et al. | |

FOREIGN PATENT DOCUMENTS

| | | |
|---|---|---|
| DE | 41 04 319 A1 | 8/1992 |
| DE | 10 2012 222 742 A1 | 3/2014 |
| EP | 3 296 347 A1 | 3/2018 |
| JP | H2-89626 | 3/1990 |
| JP | 2005-281487 | 10/2005 |
| WO | 99/64216 A1 | 12/1999 |
| WO | WO-99/64216 * | 12/1999 |
| WO | 2013/079286 A1 | 6/2013 |
| WO | WO-2013/079286 A1 * | 6/2013 |
| WO | WO 2015/074887 A1 | 5/2015 |
| WO | WO 2018/054684 A1 | 3/2018 |

OTHER PUBLICATIONS

International Search Report dated Oct. 12, 2015 in PCT/EP2015/067457 Filed Jul. 30, 2015.
European Search Report dated Feb. 12, 2015 in European Application No. 14180027.6 Filed Aug. 6, 2014.
U.S. Appl. No. 16/065,895, filed Jun. 25, 2018, US 2019/0016676 A1, Friedrich Georg Schmidt, et al.

* cited by examiner

*Primary Examiner* — Peter D. Mulcahy
(74) *Attorney, Agent, or Firm* — Oblon, McClelland, Maier & Neustadt, L.L.P.

(57) ABSTRACT

The invention concerns specifically emulsion polymers which are intraparticulately crosslinked via a hetero-Diels-Alder (HDA) mechanism. The crosslinked polymers can then be wholly or partly decrosslinked by thermal processing, for example in the form of a composite matrix, via a retro-Diels-Alder or retro-hetero-Diels-Alder reaction and interparticulately recrosslinked on cooling. This makes it possible to prepare long shelf life prepregs for composites. But it is also possible to thus realize other materials that have thermoset properties at use temperature but thermoplastic processing properties at a higher temperature.

12 Claims, No Drawings

KIT FOR PRODUCING COMPOSITE SEMI-FINISHED PRODUCTS COMPRISING REVERSIBLY CROSSLINKED POLYMER EMULSIONS

FIELD OF THE INVENTION

The present invention concerns the production of reversibly crosslinking polymer structures and particularly a novel system which, when the polymers used have high molecular weights or when high-reactivity systems are involved, represents a long shelf life formulation. The polymers, which are in dispersion, are useful, for example, for impregnating fibrous material, for example carbon fibres, glass fibres or polymeric fibres, to produce prepregs in a known manner.

The invention concerns specifically emulsion polymers which are intraparticulately crosslinked via a hetero-Diels-Alder (HDA) mechanism. The crosslinked polymers can then be wholly or partly decrosslinked by thermal processing, for example in the form of a composite matrix, via a retro-Diels-Alder or retro-hetero-Diels-Alder reaction and interparticulately recrosslinked on cooling. This makes it possible to prepare long shelf life prepregs for composites. But it is also possible to thus realize other materials that have thermoset properties at use temperature but thermoplastic processing properties at a higher temperature.

PRIOR ART

Fibre-reinforced materials in the form of prepregs are already used in many industrial applications because of their ease of handling and the increased efficiency during processing in comparison with the alternative wet-layup technology.

Industrial users of such systems, in addition to faster cycle times and higher shelf lives—even at room temperature—also demand the option of cutting the prepregs to size, without the cutting tools becoming contaminated with the often sticky matrix material during automated cutting and lay-up of the individual prepreg layers. Various moulding processes, for example the reaction transfer moulding (RTM) process, comprise introducing the reinforcing fibres into a mould, closing the mould, introducing the crosslinkable resin formulation into the mould, and then crosslinking the resin, typically by application of heat.

One of the limitations of such a process is the relative difficulty of laying the reinforcing fibres into the mould. The individual plies of the woven or non-crimp fabric have to be cut to size and conformed to the different geometries of the particular parts of the mould. This can be both time-intensive and complicated, in particular when the moulded articles are also intended to contain foam or other cores. Mouldable fibre reinforcements with simple handling and existing moulding possibilities would be desirable here.

As well as polyesters, vinyl esters and epoxy systems there are a number of specialized resins in the crosslinking matrix systems field. These also include polyurethane resins which because of their toughness, damage tolerance and strength are used in particular for the production of composite profiles via pultrusion processes. As a disadvantage, the toxicity of the isocyanates used is often mentioned. However, the toxicity of epoxy systems and the hardener components used there should also be regarded as critical. This applies especially to known sensitizations and allergies.

In addition, most matrix materials to produce prepregs for composites have the disadvantage that at the point of application to the fibre material they are either in solid form, for example in the form of a powder, or in the form of a highly viscous liquid or melt. In either case, the fibre material is only minimally penetrated by the matrix material, and this may in turn lead to suboptimal stability for the prepreg and/or the composite part.

Prepregs and composites produced therefrom on the basis of epoxy systems are for example described in WO 98/50211, EP 309 221, EP 297 674, WO 89/04335 and U.S. Pat. No. 4,377,657. In WO 2006/043019, a method for the production of prepregs on the basis of epoxide resin-polyurethane powders is described. Furthermore, prepregs based on thermoplastics in powder form as a matrix are known.

WO 99/64216 describes prepregs and composites and a method of making same by using emulsions including polymer particles having sufficiently small dimensions to allow envelopment of individual fibres. The polymers of the particles have a viscosity of at least 5000 centipoise and are either thermoplastics or crosslinking polyurethane polymers.

EP 0590702 describes powder impregnations for producing prepregs wherein the powder consists of a mixture of a thermoplastic with a reactive monomer or prepolymer.

WO 2005/091715 also describes the use of thermoplastics for the production of prepregs.

Prepregs produced using Dies-Alder reactions and potentially activable retro-Diels-Alder reactions are likewise known. A. M. Peterson et al. (ACS Applied Materials & Interfaces (2009), 1(5), 992-5) describe corresponding groups in epoxy systems. This modification bestows self-healing properties on the component parts. Systems which are analogous but do not rely on an epoxy matrix are also found inter alia in J. S. Park et al. (Composite Science and Technology (2010), 70(15), 2154-9) or in A. M. Peterson et al. (ACS Applied Materials & Interfaces (2010), 2(4), 1141-9). However, none of the cited systems makes it possible to post-modify the composites beyond self-healing. The classic Diels-Alder reaction is only insufficiently reversible under the conditions which are possible, so only minimal effects—as may be sufficient for self-healing of damaged component parts—are possible here.

EP 2 174 975 and EP 2 346 935 each describe thermally recyclable composite materials useful as a laminate which incorporate bismalelmide and furan groups. As will be readily apparent to a person skilled in the art, such a system is only reactivatable, i.e. at least largely decrosslinkable, at relatively high temperatures. Such temperatures, however, tend to induce further, secondary reactions, and so the mechanism as described is only suitable for recycling but not modifying the composites.

WO 2013/079286 describes composite materials and prepregs for producing same which include groups for a reversible hetero-Diels-Alder reaction. These systems are reversibly crosslinkable and hence the mouldings are even recyclable. However, these systems can only be applied as a liquid 100% system or from an organic solution. This puts distinct limits on the usefulness of this technology.

The systems described are all either based on organic solvents or applied in the form of a melt or in the form of a liquid 100% system. None of the systems described, however, can be applied in the form of an aqueous dispersion. Yet specifically such aqueous systems would have immense advantages in relation to industrial safety and additionally available processing technologies to produce prepregs and/or composite materials.

Problem

The problem addressed by the present invention against the background of the prior art was that of providing a novel prepreg technology to enable a simpler way to produce prepreg systems that are handleable without issues. The problem addressed by the present invention was in particular that of providing binders for producing prepregs that are capable of application in the form of an aqueous dispersion.

The problem addressed by the present invention was in particular that of providing a process for producing prepregs wherein impregnation with high molecular weight and/or high-reactivity systems is distinctly simplified as compared with the prior art.

The problem addressed by the present invention was at the same time that of providing binders that are usable in adhesives or 3D printing in the form of a powder or in the form of an extrudate.

The problem addressed by the present invention was further that of providing a process for producing prepregs which enables a distinctly prolonged shelf life and/or pot life as compared with the prior art. In addition, prepreg handleability shall be superior or at least comparable to the prior art.

There shall further be provided a process for producing composite parts whereby said composites shall be further modifiable or even recyclable after finalization. So objects produced via a 3D printing process from the material of the present invention shall correspondingly also be recyclable.

Solution

Semi-finished composite product herein is used interchangeably with prepreg and organopanel. A prepreg is generally a precursor to thermoset composite parts. An organopanel is normally a corresponding precursor to thermoplastic composite parts.

The problems were solved by making available novel kits for producing semi-finished composite products. These novel kits comprise
  A) a fibrous backing,
  B) an aqueous polymer dispersion containing
  B1) a first reactive component having two or more dienophilic double bonds, and
  B2) a second reactive component having two or more diene functionalities.
wherein the first and second reactive components are crosslinkable with each other via a Diels-Alder or hetero-Diels-Alder reaction and one or more than one of said two components B1) and B2) is an emulsion polymer, preferably a poly(meth)acrylate.

Preferably, one or more than one of said components B1) and B2) contains more than two of the recited functionalities. The recited functionalities make it possible for the first and second reactive components to be crosslinked with one another via a Diels-Alder or hetero-Diels-Alder reaction.

The reversible crosslinking mechanism is preferably a hetero-Diels-Alder reaction. It is particularly preferable for the dienophilic double bonds to be carbon-sulphur double bonds.

It is particularly preferable for the dienophilic double bonds for the hetero-Diels-Alder reaction variant to be groups having the structure

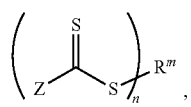

(1)

where Z is a 2-pyridyl group, a cyano group, a phosphoryl group or a sulphonyl group; $R^m$ is a multivalent organic group or a polymer; and n is a number between 2 and 20.

It is particularly preferable for the dienophilic double bonds for the second variant, involving a Diels-Alder reaction, to involve compounds having maleimide functionalities, for example a bismaleimide, particularly useful for combination with furans as component B2).

There are various ways to prepare the macromonomers having functionalization with diene or dienophile groups. In a first, simultaneously preferred alternative, copolymerizable monomers, for example (meth)acrylates having an additional diene or dienophile functionality, are copolymerized with other monomers, for example alkyl (meth)acrylates. In a second alternative, the final emulsion polymer is functionalized via a polymer-analogous reaction. This polymer-analogous reaction may be, for example, an esterifying reaction with a correspondingly functionalized alcohol. Alternatively, the polymer-analogous detachment of a protective group may also be concerned. The emulsion polymer is preferably polymerized by copolymerization of monomers having one or more than one polymerization-active group, more preferably a (meth)acrylate group, and one or more than one diene or dienophile functionality, more preferably a diene functionality.

In a third variant of the present invention, both functionalities B1) and B2) may already be present during the emulsion polymerization, particularly both as functional groups on the same emulsion polymer, or be in an already intraparticulately crosslinked state so as to constitute a reversible crosslinker in the polymerization.

In a second step, further described hereinbelow in the context of the process, whichever is the other component is then imbibed as crosslinker into the dispersion containing the emulsion polymer, or into isolated emulsion polymer solids. In other words, a component B1) is imbibed when B2) is the emulsion polymer, and B2) is imbibed when B1) is the emulsion polymer. Component B2), i.e. the component with two or more diene groups, is preferably the polymer which is produced by emulsion polymerization.

Thereupon, or after a temperature increase, the emulsion polymers are intraparticulately crosslinked. Since the crosslinking is intraparticulate, the product continues to be in the form of a stable dispersion provided the imbibition was carried out in the aqueous dispersion. This process is especially suitable when any of the functionalities of component B1) or B2), or the product formed from B1) and B2), is unstable per se, i.e. either is polymerization-active in the polymerization to form the emulsion polymer or undergoes secondary reactions under the conditions of the polymerization.

Formulation 8), comprising functionalities B1) and B2), undergoes crosslinking straight away at room temperature, i.e. immediately upon admixture of the particular second component B1) or B2). An elevated temperature can be used to hasten this crosslinking reaction for certain pairings between specific B1) and B2) functionalities. This temperature lies below the retro-Diels-Alder temperature at which the back reaction of the Diels-Alder adducts to the diene functionalities and dienophile functionalities takes place.

In this way, dimensionally stable thermosets or reversibly crosslinked composite parts are formable below the retro-Diels-Alder temperature.

The emulsion polymers may in principle be any polymer that can be prepared by emulsion polymerization and functionalized therein or polymer-analogously. Examples of such polymers include polyacrylates, polymethacrylates, polystyrenes or interpolymers formed from acrylates, methacrylates and/or styrenes. Preference is given to polymethacrylates or interpolymers formed from acrylates and methacrylates with or without a styrene fraction. Useful comonomers for such poly(meth)acrylates include in particular methyl (meth)acrylate, ethyl (meth)acrylate, propyl (meth)acrylate, isopropyl (meth)acrylate, n-butyl (meth)acrylate, tert-butyl (meth)acrylates, ethylhexyl (meth)acylate and octyl (meth)acrylate. It is also possible, for example in order to achieve superior adherence properties, to incorporate further functional groups in the polymer, examples being amine, alcohol, acid, anhydride or silyl groups.

The reactive compositions that can be used according to the invention are ecofriendly, inexpensive, have good mechanical properties, are easy to process and, after curing, are notable for good weathering resistance and also for their equality of balance between rigidity and flexibility.

The semi-finished composite products may in addition to components A and B include still further added substances. For instance light stabilizers such as, for example, sterically hindered amines, or other auxiliaries as described for example in EP 669 353 may be added in a combined amount of 0.05 to 5 wt %. Fillers and pigments such as, for example, titanium dioxide may be added in an amount of up to 30 wt % of the entire composition.

To produce the reactive polyurethane compositions of the present invention, added substances such as flow control agents. e.g. polysilicones, or adhesion promoters, for example acrylate-based adhesion promoters, may further be added.

The addition of such additional components may take place, depending on the substance, in the emulsion polymerization, by subsequent dispersal or imbibition or by formulating the dried emulsion polymer with the added substances.

The emulsion polymers and the adjuvant substances are preferably selected such that, at the particular application temperature, the dispersion is film-forming or at least produces a film of sufficient minimum stability for later use. The emulsion polymers undergo incipient sintering in the process. This incipient sintering takes the form of intraparticulate crosslinks breaking only to re-form as interparticulate crosslinks.

What is particularly surprising here is specifically the effect that materials which, following the formulation with components B1) and B2), are unambiguously in a crosslinked state (albeit a crosslinked state which is soft, depending on the composition and crosslinker fraction) are formable, even repeatedly, i.e. plastically shapeable, in a hot press for further processing. On heating, a plaque of this material becomes shapeable. On cooling, it quickly develops distinct resilience to recover to this new shape.

Backing Materials

The fibrous backings A) used according to the present invention preferably consist very largely of glass, carbon, plastics, such as polyamide (aramid) or polyester, natural fibres, or mineral fibre materials such as basalt fibres or ceramic fibres. These fibres are preferably in the form of textile fabrics comprising nonwoven web, interlooped fabric, formed-loop knits, drawn-loop knits, non-interlooped constructs such as wovens, scrims, braids, as unidirectional fibres or as unidirectional fibres, as long-fibre or short-fibre materials.

In detail, the following embodiment is present: The fibrous backing in the present invention consists of fibrous material (frequently also referred to as reinforcing fibres). The fibres may generally consist of any material, but preference is given to using fibrous material in glass, carbon, plastics, for example polyamide (aramid) or polyester, natural fibres or mineral fibre materials such as basalt fibres or ceramic fibres (oxidic fibres based on aluminium oxides and/or silicon oxides). It is also possible to use mixtures of fibre types, for example woven fabric combinations of aramid and glass fibres, or carbon and glass fibres. Hybrid composite parts are similarly obtainable by using prepregs comprising different fibrous backings. Glass fibres are the most commonly used types of fibre, mainly on account of their relatively low cost. In principle here, all types of glass-based reinforcing fibres are suitable (E-glass, S-glass, R-glass, M-glass, C-glass, ECR-glass, D-glass, AR-glass, or hollow glass fibres). Carbon fibres are generally used in high performance composites where the lower density relative to glass fibre coupled with high strength is also an important factor. Carbon fibres are industrially produced fibres from carbonaceous starting materials which are converted by pyrolysis into carbon of graphitic configuration. A distinction is made between isotropic and anisotropic types: isotropic fibres are of only low strength and low industrial importance, anisotropic fibres exhibit high strength and rigidity coupled with low elongation at break. Here all textile fibres and fibre materials which are obtained from plant and animal material (e.g., wood, cellulose, cotton, hemp, jute, flax, sisal and bamboo fibres) are described as natural fibres. Aramid fibres, like carbon fibres, exhibit a negative coefficient of thermal expansion, i.e. become shorter on heating. Their specific strength and their modulus of elasticity are markedly lower than those of carbon fibres. In combination with the positive coefficient of expansion of the matrix resin, highly dimensionally stable component parts can be manufactured. Compared with carbon fibre-reinforced plastics, the compressive strength of aramid fibre composite materials is markedly lower. Well-known brand names for aramid fibres are Nomex® and Kevlar® from DuPont, or Teijinconex®, Twaron® and Technora® from Teijin. Backings made of glass fibres, carbon fibres, aramid fibres or ceramic fibres are particularly suitable and preferred. The fibrous material is a textile fabric. Suitable are textile fabrics comprising nonwoven web, similarly interlooped fabric, such as formed-loop and drawn-loop knits, but also non-interlooped constructs such as wovens, scrims or braids. A distinction is also made between long-fibre and short-fibre materials for use as backings. Rovings and yarns are likewise suitable for the purposes of the present invention. The recited materials are all useful as fibrous backing in the context of the present invention. An overview of reinforcing fibres is contained in "Composites Technologies", Paolo Ermanni (Version 4), script for lecture at ETH Zürich, August 2007, Chapter 7.

Component B1)

Component B1) is a compound, optionally a polymer, having two or more dienophilic groups. They may be functionalities having a carbon-sulphur double bond in a first variant—crosslinking via a hetero-Diels-Alder reaction. Compound B2) of this first variant generally has the following form:

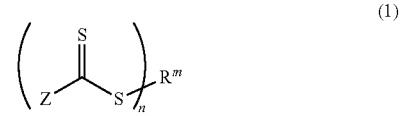

(1)

Z is an electron-withdrawing group, $R^m$ is a multivalent organic group or a polymer, and n is a number between 2 and 20 or, in the case of an emulsion polymer, between 2 and 500. What matters for selecting the group and the related diene is not just that the hetero-Diels-Alder reaction be activatable at a temperature—the crosslinking temperature $T_1$ in the case of the present invention—below 80° C. and reversible at a higher temperature, i.e. the decrosslinking temperature $T_2$, via a retro-hetero-Diels-Alder reaction, but also this higher temperature should ideally be below the decomposition temperature of the components present in the pulverulent material.

It is particularly preferable for the dienophile in this case to be a dithioester or a trithiocarbonate.

In one preferred embodiment, group Z is a 2-pyridyl group, a phosphoryl group or a sulphonyl group. Further possibilities are cyano and trifluoromethyl groups as well as any other group Z that reduces the electron density of the C=S double bond to a very substantial extent and thus allows a rapid Diels-Alder reaction.

A precise description of dienophile groups for this embodiment of a (retro-)hetero-Diels-Alder reaction is found in German patent application 102010002987.9 (and/or international patent application PCT/EP2011/050043). The feasibility of the reaction is also demonstrated in said document by means of working examples.

The second variant of the present invention, wherein crosslinking is effected via a Diels-Alder reaction, utilizes corresponding dienophiles for the Diels-Alder reaction which have a carbon-carbon double bond. Of particular suitability therefor are maleimides of general formula (6):

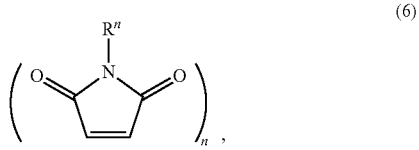

(6)

where $R'''$ is a polyvalent organic group or a polymer and n is a number between 2 and 20 or, in the case of an emulsion polymer, between 2 and 500.

It is particularly preferable for component B1) to be a low molecular weight compound and not the emulsion polymer. In this case, n is =2, 3 or 4. A particularly suitable compound for the second variant of the present invention is a bismaleimide, in particular bismaleimide-S (7):

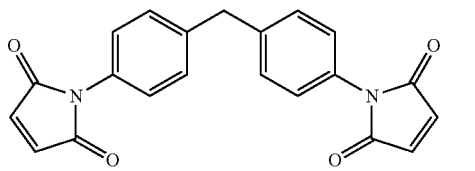

(7)

Examples of suitable low molecular weight compounds for the first variant of the present invention include compounds (8) and (9):

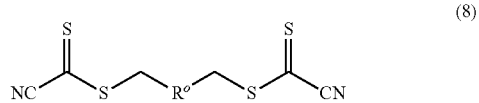

(8)

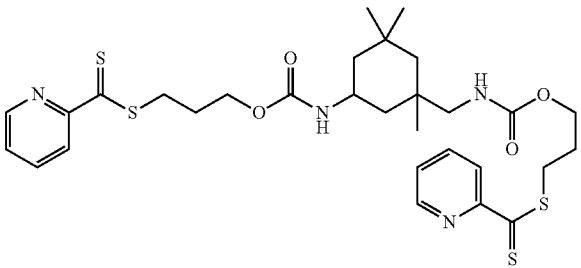

(9)

Other crosslinkers useful as component B2) are found for example in EP 2 536 797.

Component B2)

Component B is a compound having two or more diene functionalities. This compound has the general formula:

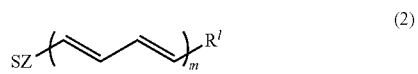

(2)

Here SZ is, if anything, an electron-donating group and as such may simply be hydrogen or a simple alkyl moiety. $R^i$ is a polyvalent organic group or a polymer, preferably the emulsion polymer, and n is a number between 2 and 2000, preferably between 3 and 500. The carbon atoms in the double bonds may additionally bear further moieties.

Familiar groups particularly useful as diene include, for example, furfuryl moieties, adducts of sorbyl alcohol or cyclopentadienyl moieties.

In the preferred case, where component B2) is the functionalized emulsion polymer, it is—as previously noted—particularly advantageous for the diene functionalities to be realized in the emulsion polymer through copolymerization of appropriate monomers. Particularly preferred monomers for this include, for example, the following ones, (acrylates corresponding to the depicted methacrylates being similarly preferable):

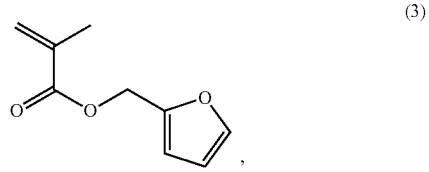

(3)

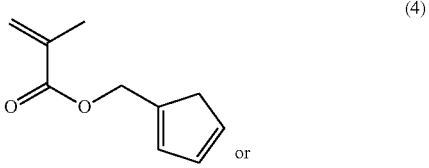

(4)

or

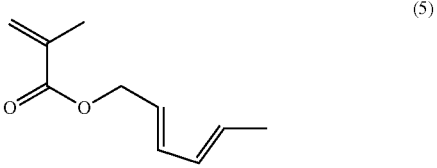

(5)

Building blocks may also be used in one particular embodiment of the present invention which have already been subjected to the Diels-Alder reaction and are polymerizable into a polymer chain via two polymerization-active functionalities. These building blocks combine with a monomer, for example MMA, in the polymerization to form a network which then used as a kit is reversibly decrosslinkable. Examples of such compounds with respectively two of these Diels-Alder linkages and two polymerization-active groups include compounds (6) and (7):

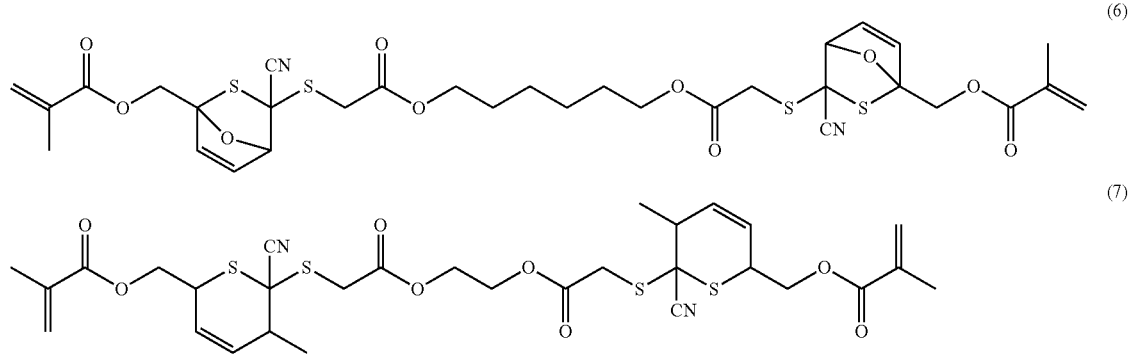

Process

The present invention further provides a novel process for producing semi-finished composite products and also their further processing into moulded parts. This process is characterized by the steps of:
 I. optionally shaping a fibrous material,
 II. preparing an aqueous poly(meth)acrylate dispersion via emulsion polymerization, wherein the monomer composition contains monomers having a group copolymerizable with (meth)acrylates and a diene functionality,
 III. mixing the dispersion from process step II. with a compound having two or more dienophilic double bonds,
 IV. directly impregnating the fibrous backing from I. with the composition from III. and shaping,
 V. curing the composition at a crosslinking temperature $T_1$.

The semi-finished composite products thus obtained from process step V. may further be subjected to the following process steps:
 VI. heating to a decrosslinking temperature $T_2$,
 VII. renewed shaping, and
 VIII. newly curing the composition at the crosslinking temperature $T_1$.

The crosslinking temperature $T_1$ in the crosslinking steps V and VIII is preferably between 0 and 60° C., more preferably between 10 and 40° C. and most preferably equal to room temperature.

The decrosslinking temperature $T_2$ in process step VI, where these crosslinks are broken apart again to an extent of not less than 50%, preferably to an extent of not less than 70%, via a retro-Diels-Alder or retro-hetero-Diels-Alder reaction, is preferably a temperature between 50 and 150° C., and more preferably between 70 and 120° C., above the crosslinking temperature $T_1$.

Process step III is carried out with particular preference at a temperature $T_3$ which is not less than 40° C. above the crosslinking temperature $T_1$. Process step V is effected by cooling down to the crosslinking temperature $T_1$.

Process step IV, the impregnating step, is effected by saturating the fibres, fabrics or scrims with the formulation obtained in process step III, in particular with that formulation in the form of a dispersion. The impregnating step is preferably carried out at the same temperature as process step III. This step of drenching and saturating the fabrics/scrims is effected in particular in the thinly liquid state of the aqueous dispersion from process step III. This is possible because the particles present therein are in a merely intraparticulately crosslinked state. The particular, immense advantage here is the fact that the emulsion particles, present side by side and unlinked, have an extremely reduced viscosity as compared with thermoplastics.

After impregnation, the water of the dispersion has to be removed. This can very simply be done by evaporation at the temperature $T_1$ or briefly at a higher temperature, which should not be more than the temperature $T_2$. At the same time, the emulsion polymer undergoes curing as per process step V. This happens in general because some of the intraparticulate crosslinks break and re-form interparticulately. In addition, free groups are also generally still present in components B1) and B2) and may react with each other interparticulately during drying. It has been found to be particularly advantageous for the formulation to be briefly dried at a temperature $T_2$ and, once the water has been removed, cooled down in process step V. to the temperature $T_1$ for curing. Such an in-between drying step is hereinbelow referred to as process step IVa.

Using the composition of components B1) and B2) according to the invention ensures very good impregnation of the fibrous backing A) because the liquid composition of components B) wets the backing A) very well, while a sufficiently high temperature during wetting prevents premature curing. There is further no need for the process steps of grinding and sieving—which are frequently required for prior art composite materials—into individual particle size fractions, so a higher yield of impregnated fibrous backing is obtainable.

The semi-finished composite products emerging from process step V are mouldable, for example compression mouldable, preferably at a temperature equal to but preferably not more than 20° C. higher than the decrosslinking temperature $T_2$. It is particularly suitable here to use a belt press to produce planar "organopanels". The crosslinking of process step V preferably takes place within the compression mould, by cooling to process temperature $T_1$. Demoulding is preferably carried out later from the cold mould at this temperature $T_1$. Optionally, the semi-finished composite product may be preformed before compression moulding, for example under pressure or else by application of a vacuum. To this end, the temperature of the workpiece may be raised to the temperature $T_2$.

The coated materials emerging from process step IV may be brought under pressure to the temperature $T_2$ at which the reversible crosslinking has been sufficiently far reversed to compress the material into a homogeneous layer. This may also be a little below the gel point of the polymer, depending on the pressure and the crosslink density and also the molar mass and glass transition temperature of the material, i.e. the materials continue to display properties of a crosslinked material, e.g. gel properties, elasticity, insolubility in solvents, swelling in solvents, and so on. Surprisingly, shaping under pressure can nonetheless also take place here at below the temperature $T_2$.

The production of a reflexibilizable/formable semi-finished composite product is concluded in process step V by cooling down to the crosslinking temperature $T_1$, preferably to room temperature, at which the matrix transitions into a covalently crosslinked state. On cooling, the matrix undergoes crosslinking not only within the semi-finished composite product, but optionally also between two or more previously assembled prepreg plies beyond the layer boundaries. Thus, the crosslinking takes place throughout the entire composite part even when said part was assembled from two or more impregnated portions.

The production of a reflexibilizable/formable semi-finished composite product in process steps I to V is optionally followed by a step of reactivating the semi-finished composite products, for renewed shaping in process steps VI to VIII. It is a particular advantage of the present invention that process steps VI to VIII are repeatable one or more times.

The shaping in process step VII or else earlier during process step V. is performable using various shaping processes. In pultrusion, in particular thermoplastic pultrusion, the impregnated semi-finished product is pulled through an arrangement of various dies. Their cross section gradually narrows to the geometry of the desired profile.

In thermoset and/or wet-winding technology, the impregnated semi-finished product is wound onto a mandrel. This process can be used to realize in particular geodetic or concave parts. Suitable temperature control during winding achieves particularly good adherence between the individual fibres.

Other geometries. In particular large-area workpieces, are obtainable via tape laying. In tape laying, impregnated semi-finished products are laid down as unidirectional tapes onto even or shaped moulding means by a laying head generally off stock reservoir bobbins. Such tools are often additionally equipped inter alia with a cutting device.

Organopanels are thermoformed in a compression-moulding process. Various versions are known for this. In multiple die forming with metal dies and punches, two halves of the tool used as a press are made of metal. In this variant, both sides of the tool are shaping elements. Small production runs in particular utilize the more flexible forming with elastomer block. In this variant, one side of the tool has a flexible, replaceable elastomer block, while the other side of the tool is a shaping element. A silicone punch is one variant thereof. In hydroforming, the first side of the tool has not an elastomer block but a chamber filled with a liquid, for example an hydraulic oil, and sealed with an elastic membrane. In diaphragm forming, the non-shaping side of the tool is a high-resiliency membrane which, during the actual pressing operation, by means of introduced gas or liquid and pressure thereby created, has a shaping effect after the closure of the tool.

Further examples of shaping processes include other winding techniques and roller moulding processes, in particular roll forming, flexural forming or the flow press process. The processes cited by way of example are all well known to a person skilled in the art and are easy to apply to the semi-finished products of the present invention.

The first shaping can also be effected via a variant of the process according to the present invention via quicktemp forming or direct impregnation. In these processes, impregnation and the first shaping take place in the same tool. The two processes otherwise resemble the described thermoforming of organopanels.

Shaped articles are additionally obtainable in the process of the present invention from the shaped semi-finished composite product in an additional process step IX via further pressing, cutting, milling, polishing and/or painting/coating. It is also possible to join two or more semi-finished composite products together, for example by adhering or stitching, to produce shaped parts.

This process step IX can take place after process step V or any process step VIII. Irrespective of when process step IX is carried out, further cycles of process steps VI to VIII can follow thereafter.

The semi-finished composite products obtained according to the present invention are notable not only for being repeatedly reshapeable, but also for their and/or the final shaped parts produced therefrom being recyclable. To this end, the semi-finished composite product ex process step V. or VIII. or a shaped article produced therefrom in process step IX. is recyclable in a process step X. at a temperature $T_4$, wherein said temperature $T_4$ is not less than the decrosslinking temperature $T_2$.

Use

In addition to the described kit and its method of processing, the composite materials, or semi-finished composite products, obtained using this kit and/or said method also form part of the subject-matter of the present invention.

These semi-finished composite products of the present invention and/or the shaped article obtained according to the present invention are useful in various ways. They are useful in particular in the manufacture of composites in boat- or shipbuilding, aerospace technology, automobile construction, for two-wheelers—preferably motorcycles and pedal cycles, in the automotive, civil engineering, biomedical engineering and sports sectors, the electrical and electronics industry, and also in power generation equipment, as for rotor blades in wind turbines.

The kit of the present invention is in addition also useful for purposes other than the production of composites. Coatings or adhesive applications come into consideration. For this, the kit may be applied for example to substrates such as, for example, metals, wood or various plastics.

The emulsion of the present invention may further be used to obtain a kit in the form of a solid material. This solid material is obtainable for example by squeezing off or spray drying. Such a solid material is then in turn extrudable into a shaped article, employable as a building material or support material in a 3D print, such as the FDM process, for example, or admixable as a component to a reversibly deployable adhesive.

EXAMPLES

Producing an Emulsion Polymer

A 2 L stirred reactor designed for emulsion polymerization is charged with 183 g of completely ion-free water and also 0.24 g of Disponil SUS IC 875 emulsifier. The completely ion-free water is heated to the target temperature of 75° C. Stirrer speed is 180 rpm. Starting at an internal temperature of 60° C., the reactor is purged with inert gas for 10 minutes. Thereafter, constant blanketing with inert gas is ensured.

Subsequently, a Woulff bottle purged with inert gas is initially charged in succession with the components for the emulsion:

0.96 g of Disponil SUS IC 875
0.72 g of 2-ethythexyl thioglycolate (TGEH)
108.00 g of methyl methacrylate
53.30 g of n-butyl methacrylate
8.0 g of furfuryl methacrylate
85.0 g of completely ion-free water
0.4 ml of 10 wt % tert-butyl hydroperoxide solution After the components have been weighed into the bottle, they are stirred for 5 minutes, followed by a quiescent period of 5 minutes and then renewed stirring for 30 minutes. Stirring is only discontinued again 20 minutes after starting the emulsion metering.

Once an internal temperature of 75° C. is attained in the reactor, 0.7 ml of 10 wt % tert-butyl hydroperoxide solution and 2.3 mL of 5 wt % sodium formaldehydesulphoxylate solution are admixed in succession.

Initiation is immediately followed by 1.1 g of emulsion/min being metered from the emulsion reservoir into the reactor for 15 minutes. The internal temperature of the reactor rises, attaining a 3° C. higher internal temperature in less than 5 minutes.

This is followed by gradual cooling down to a process temperature between 75 and 77° C. The 15 minutes of pre-metering are followed directly thereafter by the main metering at a metering rate of 2.4 g of emulsion/minute at said process temperature between 75 and 77° C. During the polymerization time the stirrer speed is set as high as 200 rpm.

An overall polymerization time of 120 minutes is followed by a 60 minute postreaction time at the process temperature. On completion of postreaction the stirrer contents are cooled down to room temperature at a stirrer speed of 200 rpm and filtered through a 250 μm nylon gauze to separate off solid constituents.

The yield is 98%. The amount of coagulum separated off in said filtration is less than 1 g based on a batch size of 450 g.

Reacting the Emulsion with MXBI Compimide:
Substances Employed:
Emulsion Polymer
Dehydran 150 defoamer
MXBI Compimide meta-xylyenebismaleimide
Procedure:

The emulsion as per the above description is initially charged to a large vessel and then admixed with about 0.1% of Dehydran 150 defoamer before the MXBI Compimide is gradually added (at about 500 rpm) and further stirring at 1000 rpm for a further 4 hours.

The required MXBI quantity corresponds to 90% of the stoichiometric equivalent based on the repeat units of furfuryl methacrylate in the polymer.

Tests with the Converted Emulsion Polymer in a Press:
Dry the material at 50° C. under reduced pressure for about 12 hours.

The dried powder is then comminuted until homogeneous and the homogeneous powder obtained in the process is placed in a compression mould and compression moulded into tablets or rodlets.

A moulding force of 50 to 55 kN is applied at a temperature between 160 and 180° C. for a period of 10 min.

Producing a Prepreg

Process step IV of directly impregnating the fibrous backing of glass, carbon or plastic from process step I. with the dispersion from process step III. is effected on commercially available coater systems, here a vertical coater. The fibrous backing is introduced into the process by clamping into the coater system. The dispersion from process step III. has a viscosity of 700 mPas and is introduced into the coater process via a pumped system with upstream stirring mechanism. In contradistinction to the usual methods of impregnation with thermoplastic matrices, which are impregnated with solid powder or at elevated temperatures in the melt, there is the option here of a liquid impregnation with the hereinabove detailed advantages of very good and homogeneous fibre impregnation.

The fibre material moves through this continuous process at a linear speed vi of 0.7 m/min. Impregnation is by kiss coating or alternatively by pad-mangling.

The vertical direction of the web minimizes matrix loss and additionally improves the homogeneity of impregnation and thus the quality of the prepreg. The matrix content is controllable within a range from 15 wt % to 60 wt % via the viscosity of the dispersion and downstream squeegees. In the case of the 700 mPas viscosity dispersion used in this example and two downstream squeegees to additionally enhance the impregnation quality by further squeezing through the matrix, the matrix content is 40 wt %. The fibre material saturated with dispersion is dried at a temperature of 130° C., i.e. at above $T_1$ but below $T_2$, for 5 minutes in a circulating air oven, or alternatively with IR radiators. Residual volatility as quantified via mass loss and DSC is below 1 wt %.

Since drying is carried out at a temperature above $T_1$, the dried polymer is in the form of a crosslinked film. So a polymeric film has formed in contrast with, for example, prepregs produced by powder impregnation. The continuous prepreg obtained in this process accordingly remains flexible and allows simplified winding via suitable winding means without matrix fracture. Direct cutting within the impregnating process is not required because winding is possible, even to very low radii, without loss of matrix and/or quality.

Producing a Laminate

The crosslinked and dried semi-finished composite products (prepregs) are mouldable into a component part via process steps VI, VII and VIII. In this example an 8 ply prepreg construction having a matrix content of 40 wt % is IR heated to 200° C. in the course of 60 seconds and immediately placed in a cold mould. The heated multi-ply prepreg construction is subjected in the mould to a surface pressure of 40 bar for a further 60 seconds while being cooled down to room temperature and shaped. Once the temperature is below $T_1$, the component part formed is in a crosslinked state having the above-described properties and a part thickness of 2 mm. Overall cycle time including heating, shaping and cooling is 2 minutes.

In contradistinction to other crosslinking prepreg systems such as epoxides, crosslinking takes place during cooling and not at elevated temperatures. This shortens the cycle time from above 10 minutes to 2 minutes. The shaped component part was reshaped and cured in three identical cycles in order to verify the reversibility of the crosslinking. The component part obtained is in a crosslinked and dry state at a temperature below $T_1$, like the prepregs. At temperatures above $T_2$, the component part is a non-crosslinked thermoplastic melt having a viscosity of 150 Pas and is newly shapeable and, by cooling, curable.

The invention claimed is:

1. A process for producing a semi-finished composite product or a moulded part of the semi-finished composite product, the process comprising:
   (I) optionally shaping a fibrous material,
   (II) preparing an aqueous poly(meth)acrylate dispersion via emulsion polymerization of a monomer composition, wherein the monomer composition comprises monomers having:
   a group copolymerizable with (meth)acrylates, and
   a diene functionality,
   (III) mixing the dispersion with a compound comprising two or more dienophilic double bonds to produce a second composition,
   (IV) directly impregnating the fibrous material with the second composition and shaping into an uncured shaped composition, and
   (V) curing the uncured shaped composition at a crosslinking temperature $T_1$ thereby obtaining the semi-finished composite product or the moulded part of the semi-finished composite product,
   wherein the compound comprising two or more dienophilic double bonds comprises meta-xylylenebismaleimide.

2. The process according to claim 1, further comprising:
   (VI) heating the semi-finished composite product or the moulded part of the semi-finished composite product to a decrosslinking temperature $T_2$ to produce a decrosslinked product,
   (VII) reshaping the decrosslinked product into a reshaped composition, and
   (VIII) newly curing the reshaped composition at the crosslinking temperature $T_1$.

3. The process according to claim 2, wherein the crosslinking temperature $T_1$ in step (V), step (VIII), or both, is between 0 and 60° C.

4. The process according to claim 2, wherein:
   step (V), step (VIII), or both, are performed at room temperature,
   at least 50% of crosslinks are redetached in step (VI) at the decrosslinking temperature $T_2$ via a retro-hetero-Diels-Alder reaction, and
   the decrosslinking temperature $T_2$ is between 50 and 150° C. above the crosslinking temperature $T_1$.

5. The process according to claim 1, wherein:
   the step (III) and the step (IV) are carried out at a temperature $T_3$ which is at least 40° C. above the crosslinking temperature $T_1$, and
   the step (V) is performed by cooling down to the crosslinking temperature $T_1$.

6. The process according to claim 2, wherein the steps (VI)-(VIII) are repeated.

7. The process according to claim 1, wherein, after process step (IV), the uncured shaped composition is dried at a temperature $T_2$ in a step (IVa).

8. The process according to claim 2, further comprising:
   cutting, milling, polishing, painting, or coating the semi-finished composite product or the moulded part of the semi-finished composite product after step (V) or step (VIII) to form a shaped article in a process step (IX).

9. The process according to claim 2, further comprising:
   recycling the semi-finished composite product or the moulded part of the semi-finished composite product from step (V) or step (VIII) in a step (X) at a temperature $T_4$,
   wherein said temperature $T_4$ is not less than the decrosslinking temperature $T_2$.

10. A semi-finished composite product or a moulded part of the semi-finished composite product obtained by the process of claim 1, wherein the semi-finished composite product is at least one selected from the group consisting of a boat- or shipbuilding product, an aerospace technology product, an automobile construction product, a two-wheeler product, a civil engineering product, a biomedical engineering product, a sports sector product, an electrical product, an electronics industry product and a power generation product.

11. A shaped article obtained from the process of claim 8, which is at least one selected from the group consisting of a boat- or shipbuilding product, an aerospace technology product, an automobile construction product, a two-wheeler product, a civil engineering product, a biomedical engineering product, a sports sector product, an electrical product, an electronics industry product and a power generation product.

12. The process according to claim 8, further comprising:
   recycling the shaped article from step (IX) in step (X) at a temperature $T_4$, wherein said temperature $T_4$ is not less than the decrosslinking temperature $T_2$.

* * * * *